Dec. 4, 1934.  E. H. SPIEGL  1,983,052
SYSTEM OF HANDLING PRODUCE SUCH AS LETTUCE
Filed Feb. 4, 1933  3 Sheets-Sheet 3
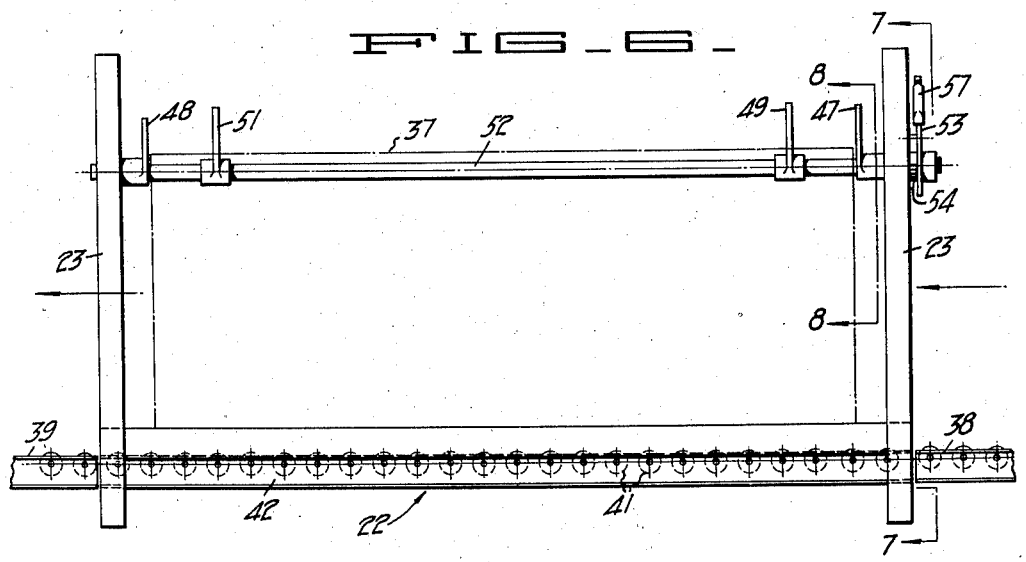
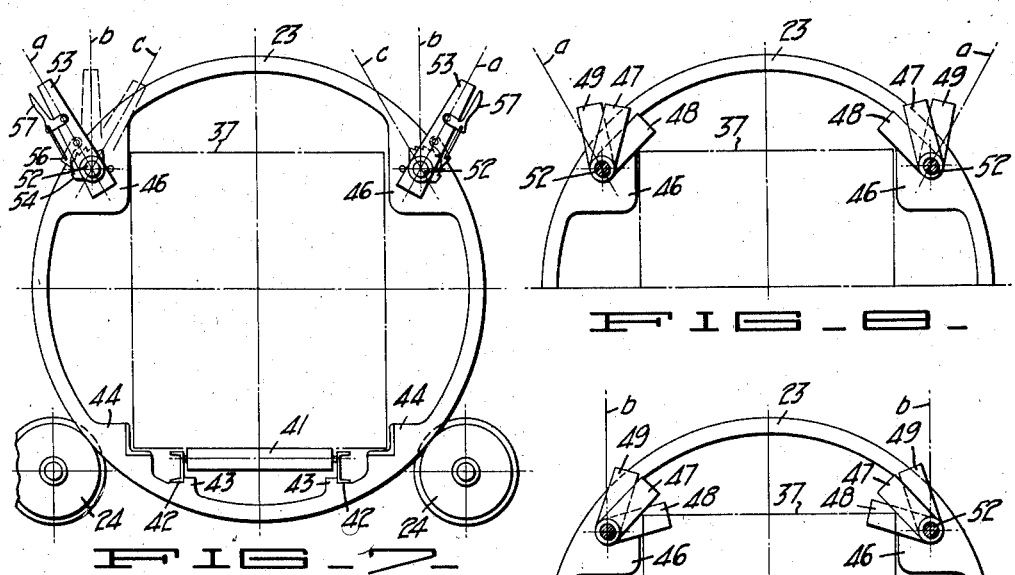
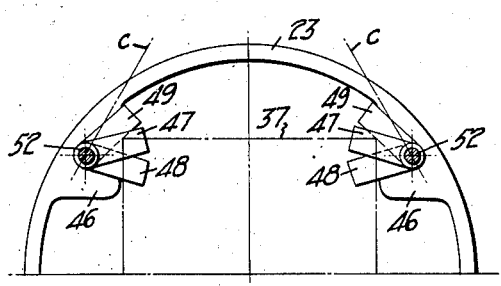
INVENTOR.
Ellis H. Spiegl
BY
White, Prost, Flehr & Lothrop
ATTORNEYS.

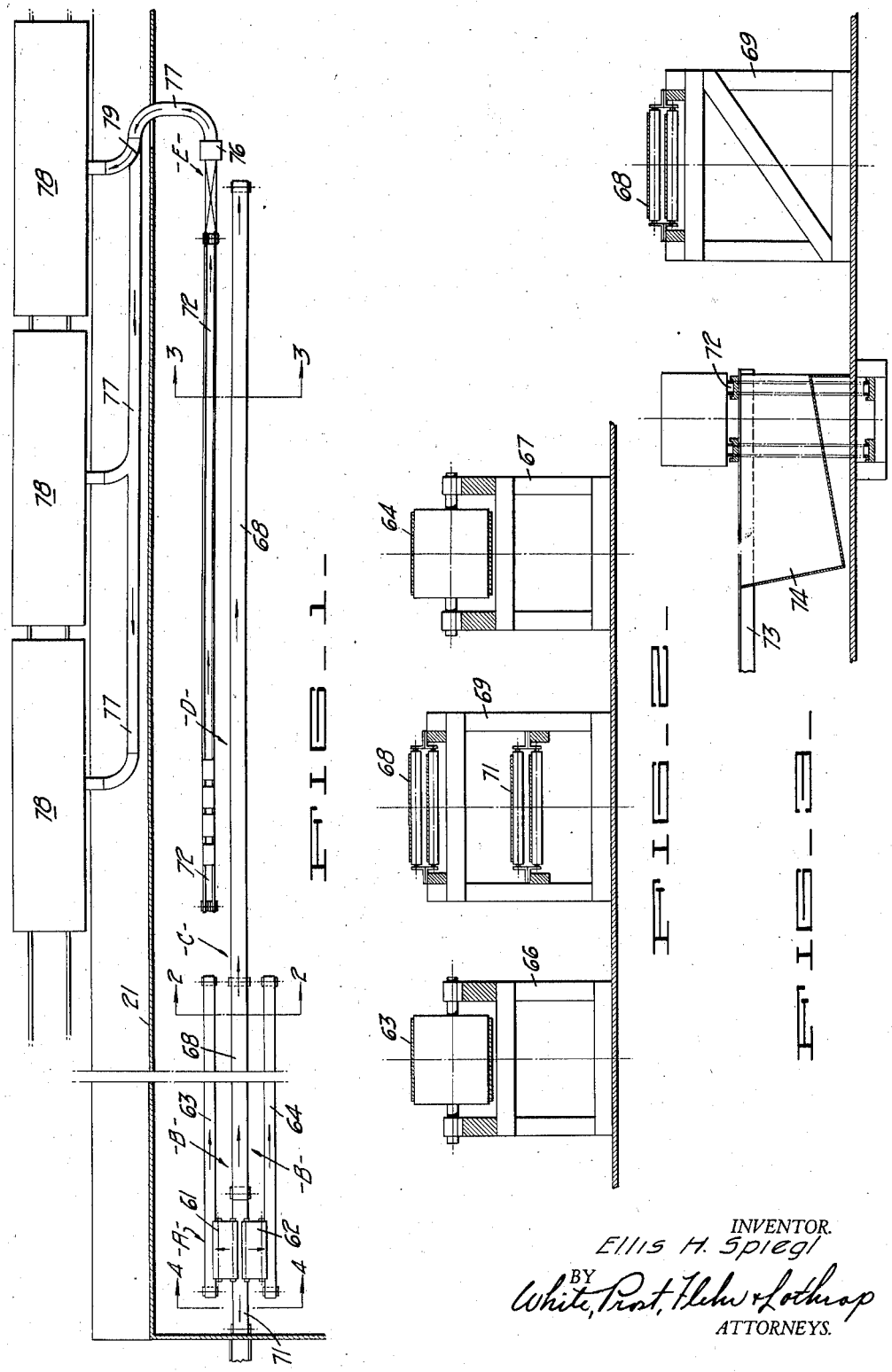

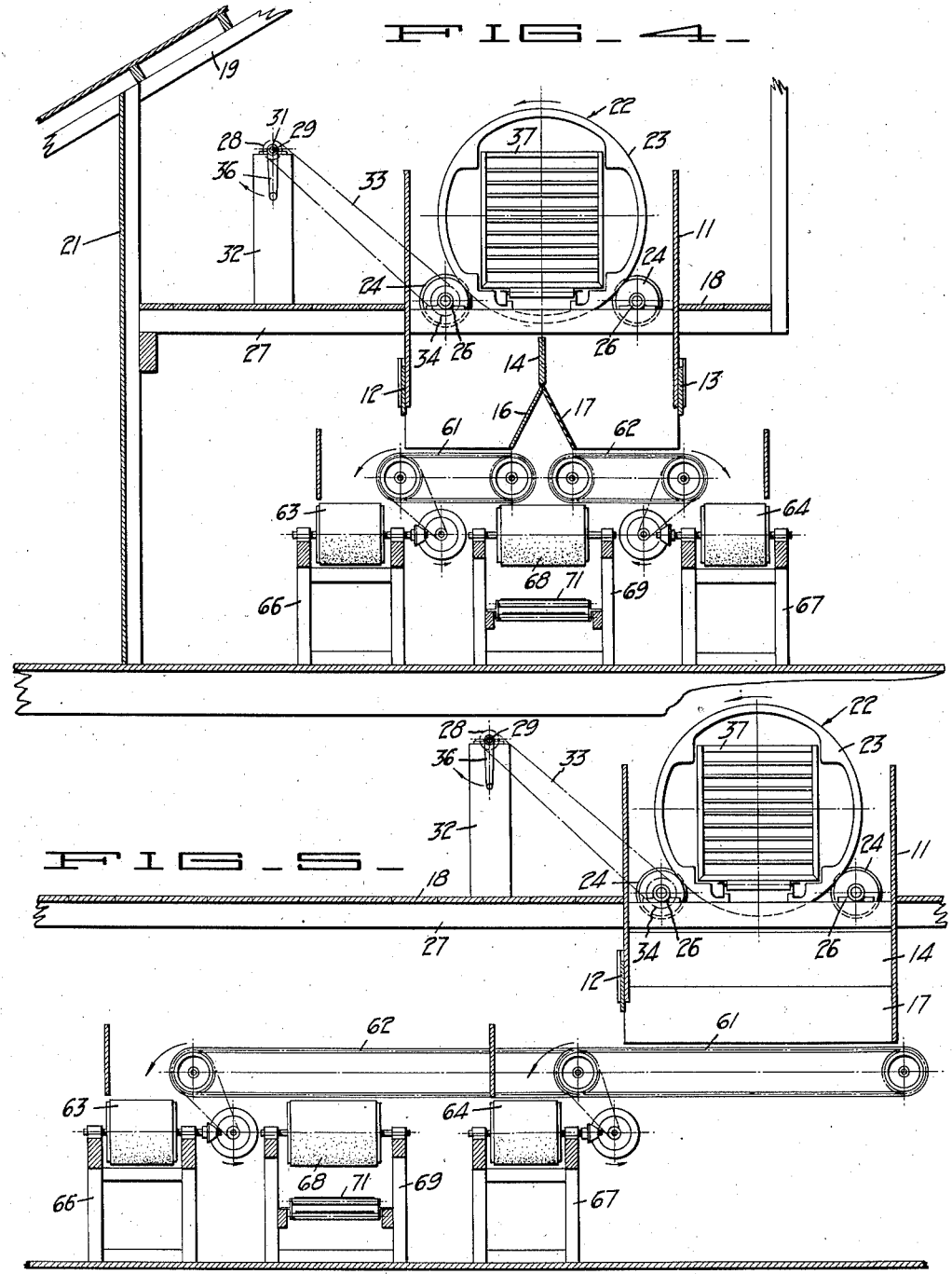

Patented Dec. 4, 1934

1,983,052

UNITED STATES PATENT OFFICE 1,983,052

SYSTEM OF HANDLING PRODUCE SUCH AS LETTUCE

Ellis H. Spiegl, Salinas, Calif.

Application February 4, 1933, Serial No. 655,231

2 Claims. (Cl. 214—1.1)

The invention, generally, relates to systems involving the gathering and processing of farm produce, such as lettuce and the like. More particularly, the invention relates to a novel system, including apparatus, which affords rapid and substantially continuous movement of the produce during the gathering and processing of the same for marketing.

While the system hereinafter described can be adapted for handling and packing a variety of kinds of produce, it has been designed and is especially suitable for the handling, trimming, grading and packaging of lettuce, and accordingly I shall describe the system in such environment.

The present almost universal mode of harvesting lettuce has been set forth in my co-pending application, Serial No. 653,222, filed January 24, 1933, and entitled "Gathering apparatus and method", wherein I have also disclosed novel apparatus and a novel method of gathering the crops of the field. Briefly, the common practice in harvesting lettuce requires the utilization of a considerable number of relatively small crates, all of a standard capacity, which are hauled to a field and distributed at intervals between the mounds of lettuce. A group of pickers, usually eight or ten, traverse the field, sever the ripe lettuce from the soil, and deposit the same near the empty crates. Another group, styled packers, and usually approximately twice as many as pickers, follow the pickers and pack the severed lettuce heads in the several crates. The filled crates are then loaded by a loading crew upon trucks for hauling to the lettuce sheds for processing including trimming, grading and re-packing for shipment. The apparatus and method disclosed and described in my aforementioned co-pending application constitute a part of my novel system of handling the produce, a system which eliminates the handling of relatively large numbers of small crates, as well as other field operations including the packing thereof in the field.

In general, the novel gathering apparatus of my invention, which is disclosed in the above-identified co-pending application, comprises a vehicle which is adapted to move over a field of crops, together with a trailing conveyor mounted upon the vehicle for initially receiving lettuce severed by the workmen and for carrying the same to relatively large containers which are removably mounted upon the vehicle.

As I have stated above, my novel system of handling lettuce includes as a part thereof the aforementioned gathering apparatus and method. The remainder of the system is hereinafter set forth, and is a system which serves to a large extent to dispense with presently used equipment and practices in the trimming, grading and packing for shipment operations which involve a considerable loss of time and require an undue amount of labor.

It may be perhaps well known that the present method of handling lettuce during the trimming, grading and packing operations is somewhat cumbersome. Briefly, the presently followed practice comprises the following steps. Filled lettuce crates which are hauled from the field are placed upon the platform of a lettuce shed from which the several crates are conveyed, usually by manually-actuated trucks or dollies, to work tables about which the trimmers, graders and packers are stationed. Any desired number of worktables can be utilized, but it is to be observed that the groups of workers congregated about each table include trimmers, graders and packers. In the novel system of handling lettuce hereinafter described, the groups of workmen are rearranged so that one group consists of trimmers only, a second group consists of graders only, and still another group consists of packers only, thereby overcoming to a large extent cumbersome operations and loss of time involved in the present practice which requires an intermixing of crews for carrying out different operations.

The trimming operation is the first step of the process and consists in removing soiled and damaged outer leaves of the heads, as well as trimming the butts of the lettuce by cutting the butt back so as to be flush with the leaves. Normally, two trimmers are employed for each lettuce crate, the crates being stacked between two trimmers, and the damaged or soiled leaves are dropped into a chute between the trimmers which leads to means for conveying the lettuce to a bin for future disposal.

After the trimming operation, the trimmed heads are placed upon the work tables and packers, stationed across the table from the trimmers, pack the lettuce into shipping crates, inserting the requisite amount of cracked ice. There is little, if any, grading of the lettuce, and what grading does take place is more or less inconsequential, the packers having to pack fairly rapidly to keep up with the trimmers. The packed crates are then loaded upon a conveyor leading to a pressing machine which serves to press the heads firmly into the crate and affix a lid thereto. After the pressing and lidding operation, the shipping crates are placed upon suitable conveyors leading to the cars or trucks for shipment to market.

It seems apparent that there is a considerable loss of time between these several above-mentioned operations, due, to a large extent, to the "stacking up" of trimmed lettuce upon the work tables which hinders the grading and packing. Also, there is loss of time because of the difference in skill between the several trimmers, one trimmer usually having to wait for the other before commencing upon a second crate of lettuce. Further, it is also apparent that there is a considerable handling and rehandling of small lettuce crates, including the conveyance of filled crates to the work tables and the reconveyance of empty crates to the loading platform for rehauling to the field.

It is an object of my invention to provide a novel system of handling lettuce not only for field operations, but also for shed operations involving the trimming, grading and packing of the lettuce heads, which affords a saving in time of handling and reduces the required labor to a minimum.

A further object of the invention is to provide a novel system of handling lettuce which dispenses with the handling and rehandling of large numbers of relatively small crates.

A further object of the invention is to provide a system of the character aforementioned which affords substantially continuous movement of the lettuce during trimming, grading and packing operations and consequently avoids long intervals of idleness on the part of one crew while waiting for another crew.

A still further object of the invention is to provide a system of the aforementioned nature which affords substantially a continuous removal of waste or damaged lettuce from the vicinity of the lettuce sheds and accordingly overcomes present unsanitary conditions arising from the presence of such waste about the shed during such operations.

Other objects of the invention, together with some of the advantageous features thereof, will appear from the following description of the preferred embodiment of the invention which is illustrated in the accompanying drawings.

In the drawings:

Figure 1 is a plan view of the embodiment of the invention, illustrated diagrammatically.

Figure 2 is an elevational view of one portion of the embodiment of the invention taken on the section line 2—2 of Figure 1.

Figure 3 is an elevational view of another portion of the embodiment of the invention illustrated in Figure 1 and taken on the section line 3—3 of Figure 1.

Figure 4 is an elevational view, partly in cross-section, of still another portion of the embodiment of the invention which is shown in Figure 1, taken on the line 4—4 of Figure 1.

Figure 5 is an elevational view, partly in cross-section, of a modified embodiment of that portion of the invention which is illustrated in Figure 4.

Figure 6 is a side elevation of a detail of that portion of the embodiment of the invention which is illustrated in Figures 4 and 5.

Figure 7 is an end elevation taken on the line 7—7 of Figure 6 and illustrating the various stop elements and locking mechanisms for that portion of the embodiment of the invention which is shown in Figures 4 and 5.

Figure 8 is a detail, taken on the line 8—8 of Figure 6, of that portion of the embodiment of the invention which is shown in Figures 4 and 5 and illustrating the several positions taken by the stop elements thereof when the latching mechanism is placed in open position.

Figure 9 is a detail of that portion of the embodiment which is illustrated in Figures 4 and 5, showing the several positions of the stop elements thereof when the latch mechanism is placed in a second or partly-closed position.

Figure 10 is an elevational view similar to the showing of Figures 8 and 9 but illustrating the stops in their several positions when the latching mechanism is closed.

The system of handling lettuce of my invention preferably comprises, in addition to the units or apparatus for gathering the lettuce in the field and conveying the same to the lettuce sheds, a plurality of units in the lettuce shed so arranged as to afford movement of the lettuce substantially continuously from an initial receiving and dumping station through several stations to a final packaging station, the lettuce being trimmed, graded and packed during the movement thereof between the several stations.

In accordance with the invention, I provide at an initial station, generally designated by the reference character A, see Figure 1 of the drawings, a hopper 11 having adjustable gates 12 and 13 in its side walls and also provided with an interior dividing wall 14 having inclined portions 16 and 17 for guiding the lettuce, see Figure 4 of the drawings. The hopper 11 is conveniently supported by a platform 18 which is provided adjacent the upper portion or roof 19 of a lettuce shed 21. Revolvably mounted within the hopper 11 is a hollow body or drum 22, of generally cylindrical shape, having annular ends 23. Each end 23 is supported upon a pair of rollers 24, three of which conveniently can be idler rollers and the fourth of which can be driven, the several rollers being journaled in bearings 26 carried by beams 27 which support the platform 18. Any suitable means can be utilized for driving the fourth roller 24; however, as illustrated in Figure 4 of the drawings, I preferably employ a chain drive which is actuated manually. As illustrated, a sprocket 28 is keyed to a shaft 29 journaled in a bearing 31 which is carried by a standard 32 mounted upon the platform 18 adjacent the hopper, and a chain 33 is trained over the sprocket 28 as well as over a sprocket 34 keyed to rotate with one of the rollers 24. A suitable crank 36 is employed for rotating the shaft 29 and the sprocket 28, rotation thereof causing the revolving of the drum 22 in the direction indicated by the arrows in Figures 4 and 5. It is to be understood, however, that power means can be utilized to rotate the rollers 24, if desired.

The drum 22 constitutes a container-receiving and dumping unit and preferably is constructed to such dimensions as to accommodate the relatively large containers 37 which form a part of my gathering apparatus disclosed in my aforementioned co-pending application and which have a capacity equivalent to from fifteen to eighteen of the conventionally employed or standard lettuce crates. To effect the ingress of lettuce-filled containers 37 into the drum, as well as egress of the empty containers therefrom, I conveniently provide roller conveyors 38 and 39 mounted on the platform 18 and leading respectively to and from opposite ends 23 of the drum, as well as rollers 41 in the floor of the body or drum, see Figure 6 of the drawings. After the containers 37 have been hauled from the field, they are hoisted to the platform 18, positioned on the roller conveyors 38, and manually or otherwise rolled to the drum 22 and into the same upon the rollers 41. The rollers 41 conveniently are mounted upon channels 42 which span the drum and which are seated on interior shoulders 43 formed in the ends 23. The ends 23 also are provided with interior guides or abutments 44 at their bases as well as guides or abutments 46 adjacent the tops thereof for bracing and guiding the containers 37. After the dumping operation the emptied containers 37 are rolled from the drum 22 onto the roller conveyors 39 leading to an exit for loading and rehauling to the field.

In order to lock a container 37 against displacement from the drum 22 during dumping operations, I conveniently provide a plurality of stops or abutments, which include a pair of stops 47 at one end and at opposite sides of the drum, a pair of stops 48 at the other end and at opposite sides of the drum, and a plurality of pairs of stops 49 and 51 between the ends and at opposite sides of the drum, all of which are mounted upon a pair of longitudinally extending shafts 52 journaled in the ends 23 and at both sides of the drum. I also provide means for rotating the shafts 52 so that the several stops or abutments can be brought into and moved out of engagement with the container 37 when desired. These means include handles 53 which are keyed to the shafts 52, and ratchet and pawl mechanisms 54 and 56 respectively, the ratchets being mounted on the ends 23 and the pawls being loosely connected to grip members 57 which are pivoted to the handles 53; see Figure 7 of the drawings.

In Figure 7 I have diagrammatically illustrated the several positions in which the handles 53 can be placed, and in Figures 8 to 10 inclusive I have illustrated diagrammatically the several positions which the several stops 47 to 51 inclusive take for the corresponding positions of the handles 53. With particular reference to Figure 7 of the drawings, the handles 53 can be placed in position so that none of the stops 47 to 51 inclusive is in engagement with the container, as illustrated in Figure 8 of the drawings, these positions of the handles being indicated by the reference character a. The positions a of the handles 53 are taken prior to the dumping operation, with the container 37 in position on the drum, as well as after the dumping operation, so that the container 37 is released for movement off the rollers 41 onto the rollers 39. At the intermediate positions of the handles 53, as indicated by the reference character b of Figure 7, the several stops are moved to the position shown in Figure 9, with the stops 48 at one end of the drum abutting one end of the container 37, thereby preventing movement of the container in one longitudinal direction. At the final or "on" positions of the handles 53, as indicated by the reference character c of Figure 7, the several stops 47 to 51 inclusive are further moved so as to bring the stops 47 at the other end of the drum 22 into abutment with the other end of the container, whereby the container is fully constrained against longitudinal movement and the stops 49 and 51 are carried into engagement with the sides of the container 37 to prevent lateral displacement thereof during the dumping operations.

If desired, means other than those above described for revolving the drum 22 during the dumping operation, can be employed. For example, the chain drive 33 and the crank 36 can be dispensed with and the rollers or trunnion wheels 24 can be mounted on ball bearings to facilitate revolving of the drum by hand.

In the dumping operation, and with the container 37 restrained against longitudinal and lateral movement within the drum, the operator is required merely to cause a revolving of the drum 22 and an upsetting of the container 37. The content of the container, if the modification of the dumping unit illustrated in Figure 4 of the drawings is employed, is divided longitudinally of the container by the dividing wall 14 of the hopper 11, and approximately one half of the lettuce follows the inclined guide portion 16 of the dividing wall, while the balance of the lettuce follows the inclined guide portion 17 of the dividing wall. As illustrated in Figure 4, lettuce dumped from the container 37 falls upon feed conveyors 61 and 62 which are of equal extent and the upper runs of which are arranged to move in opposite directions. The conveyors 61 and 62 lead respectively to work conveyors 63 and 64, the construction and positions of which within the shed will be more fully hereinafter described.

A modification of the dumping unit is illustrated in Figure 5 of the drawings, in which the hopper 11 and the drum 22 are supported adjacent a side wall of the shed rather than at the approximate transverse center of the shed, and the content of the container 37 is divided transversely of the container rather than divided longitudinally thereof, as is the case when using the dumping units illustrated in Figure 4 of the drawings. In this modification, that is, the modification shown in Figure 5 of the drawings, the dividing wall 14 of the hopper is disposed transversely of the hopper 11, as illustrated. Approximately one half of the content of the container 37, therefore, follows one inclined portion of the dividing wall 14 while the balance of the content follows the other inclined guide portion 17 of the dividing wall and falls upon adjacent feed conveyors 61 and 62. In this modification the upper runs of conveyors 61 and 62 are arranged to move in the same direction, and the conveyor 61 is shorter in length than the conveyor 62. The feed conveyors 61 and 62 lead to the work conveyors 63 and 64, as in the modification shown in Figure 4 of the drawings. The feed conveyors 61 and 62 preferably comprise spaced chains which are connected together by a plurality of spaced bars and can be in all respect similar to the trailing conveyors of the gathering apparatus of my invention which is described in my aforementioned co-pending application.

While feed conveyors 61 and 62 are indicated in the drawings as being supported in horizontal positions, these conveyors, if desired and if deemed advisable, can be supported in positions at an inclination to the horizontal. Moreover, although the feed conveyors are disposed at substantially right angles to the work conveyors 63 and 64, the conveyors 61 and 62 can be disposed at any angle with respect to the conveyors 63 and 64 which is deemed advantageous.

The work conveyors 63 and 64 which receive the lettuce from the feed conveyors 61 and 62 respectively, are disposed in the lettuce shed at a station which is generally indicated by the reference character B in Figure 1 of the drawings. The work conveyors conveniently are supported on frames 66 and 67, respectively, which are spaced apart as illustrated in Figure 4 and preferably are of the belt type, each belt being of substantially the same width and length. As illustrated, the feed conveyors 61 and 62 can be driven from the work conveyors 63 and 64, respectively, by any suitable driving means, such as bevel gears, pulleys and chain drives. Further, suitable gear ratios can be employed to drive the feed conveyors and work conveyors at the same speed or at different speeds, as desired.

In the system of my invention, the trimmers are positioned at stations B between the two work conveyors 63 and 64. The trimmers remove the lettuce from the work conveyors, remove all damaged and soiled leaves from the several heads, cut the butts thereof so as to be flush with the leaves, and then place the trimmed lettuce upon a grading conveyor 68 which is supported by means of a suitable framework 69 between the two work conveyors 63 and 64. The damaged and soiled leaves and the butt portions which have been removed from the lettuce heads by the trimmers, are placed upon a refuse conveyor 71 which likewise is supported by framework 69, but below the grading conveyor 68.

While the upper run of the refuse conveyor 71 can be caused to move in the same direction as the upper run of the grading conveyor 68, as indicated by the arrow in Figure 1 of the drawings, I preferably arrange that the upper run of the refuse conveyor is caused to move in a direction opposite to the direction in which the upper run of the grading conveyor is caused to move. With this arrangement I obviate the obstruction of space which is allocated, in my system, for the graders, and utilize space under the dumping unit to carry the refuse out of the shed for disposal.

In accordance with the invention, the work conveyors 63 and 64, although of approximate equal length, are shorter in length than the grading conveyor 68, the work conveyors terminating at the grading station, generally designated by the reference character C; see Figure 1 of the drawings. The refuse conveyor 71 likewise terminates at the grading station C. Further, I preferably cause the work conveyors 63 and 64 to move at slower speeds than the speed of movement of the grading conveyor 68, in order that the trimmers can remove all lettuce heads received on conveyors 63 and 64 before the grading station C is reached.

Graders for sorting the produce into several grades, according to size and quality, are positioned, in accordance with my system, at station C and on opposite sides of the grading conveyor 68. The lettuce heads are merely moved about by the graders upon the upper run of conveyor 68, in line with the selection of the grader, and are not removed therefrom.

The individual heads of lettuce are carried by conveyor 68 through station C to a station generally indicated by the reference character D, see Figure 1 of the drawings, where packers are positioned and at which station the individual or separate heads of lettuce are removed from the conveyor 68 and packed in shipping crates of the conventional or standard character. The packed crates are then placed upon a crate conveyor 72 which can be positively driven by a chain drive, as indicated in Figure 3 of the drawings, or which can be of the gravity roller type. The crate conveyor 72 is supported on framework 73 which preferably extends from the grading station C to a crate pressing and lidding station, indicated generally by the reference character E in Figure 1 of the drawings. While I have shown but one crate conveyor 72, it is to be understood that within the scope of the invention two or more crate conveyors can be utilized, and, further, that the packers of crates can take positions on both sides of the grading conveyor 68, if desired.

Inasmuch as, in accordance with the usual custom, the packed crates for shipment should contain a suitable quantity of ice, I have provided, at convenient intervals along the extent of the crate conveyor 72, a plurality of ice bins 74 for the reception of cracked ice which is to be inserted in the crates by the packers.

If desired, empty shipping crates can be placed upon the crate conveyer 72 and the packers can place the graded lettuce directly from conveyor 68 into the empty crates during their movement along crate conveyor 72, ice being inserted into the crates, at frequent intervals, in accordance with the usual practice.

At the termination of the crate conveyor adjacent the station E, I have provided presser and lidding apparatus, designated generally by the reference number 76, at which point the heads of lettuce in each crate are firmly pressed thereinto and a lid is fitted and affixed to the crate. If two or more crate conveyors 72 are employed, it may be desirable to install additional pressers and lidders 76 to accommodate the increased amount of packed crates received at station E.

After the crates have been lidded they are placed upon a car conveyor 77 which extends out of the shed 21 and along the car platform adjacent the freight cars or other shipping means 78. The car conveyor 77 likewise can be of the gravity roller type and can be provided with conventional plows 79 for diverting the crates from the entrance of one car to the entrance of another at the will of the car loaders.

As I have above indicated, it is the present practice to convey damaged and soiled leaves, butt portions and other refuse from the trimming or work tables to a bin stationed outside of the shed 21. Frequently, this refuse and débris is allowed to remain in the bin for an appreciable time, which results in an unsanitary condition about the shed as well as in offensive odors. Moreover, it is usual that at the time of removing the refuse from the bin the bin chute becomes clogged and requires the attention and time of several workmen to overcome such condition. In accordance with my novel system of handling lettuce, I have provided for the continuous removal of refuse by extending the refuse conveyor 71 out of the lettuce shed to a convenient point for refuse removal. Under this arrangement, provision is made for continuously removing all refuse or waste from the vicinity of the sheds, and hence unsanitary conditions are obviated.

While I have illustrated the preferred embodiment of my invention and the preferred arrangement thereof in accordance with my novel system of handling lettuce, it is to be understood that I am not to be limited to the embodiment and arrangement illustrated, as the invention, as defined in the appended claims, can be embodied in a plurality of forms and arranged in a variety of ways.

I claim:

1. In a system of handling produce a dumping means comprising a pair of spaced circular ends having shoulders therein, channels spanning the space between said ends, a plurality of rollers extending transversely between and journalled in said channels to form a container supporting floor, and abutments on said ends adjacent said rollers to confine a container against lateral movement on said rollers.

2. In a system of handling produce a dumping means comprising a pair of spaced end rings, channels extending between and fastened to said ends, a plurality of rollers extending transversely between said channels to form a container supporting floor, and angles extending between and fastened to said ends in alinement with said rollers to form an extension of said floor and to confine a container against lateral movement on said rollers.

ELLIS H. SPIEGL.